United States Patent
Kondo et al.

(10) Patent No.: US 10,547,069 B2
(45) Date of Patent: Jan. 28, 2020

(54) FUEL CELL HAVING END CELL WITH BYPASS PASSAGE

(71) Applicant: TOYOTA SHATAI KABUSHIKI KAISHA, Kariya-shi, Aichi-ken (JP)

(72) Inventors: Takashi Kondo, Kariya (JP); Keiji Hashimoto, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 140 days.

(21) Appl. No.: 15/726,597

(22) Filed: Oct. 6, 2017

(65) Prior Publication Data
US 2018/0108923 A1 Apr. 19, 2018

(30) Foreign Application Priority Data
Oct. 19, 2016 (JP) .................. 2016-205374

(51) Int. Cl.
*H01M 8/0258* (2016.01)
*H01M 8/0247* (2016.01)
*H01M 8/0202* (2016.01)
*H01M 8/2457* (2016.01)
*H01M 8/2483* (2016.01)
(Continued)

(52) U.S. Cl.
CPC ..... *H01M 8/04291* (2013.01); *H01M 8/0202* (2013.01); *H01M 8/0247* (2013.01); *H01M 8/0258* (2013.01); *H01M 8/241* (2013.01); *H01M 8/2457* (2016.02); *H01M 8/2483* (2016.02)

(58) Field of Classification Search
None
See application file for complete search history.

(56) References Cited

U.S. PATENT DOCUMENTS 6,884,536 B1 * 4/2005 Hatoh ............... H01M 8/0247
429/433
6,936,369 B1 * 8/2005 Komura ............ H01M 8/0247
429/457
(Continued)

FOREIGN PATENT DOCUMENTS

JP 2001236975 A * 8/2001
JP 2009-164051 A 7/2009

OTHER PUBLICATIONS

Koumura et al. JP 2001 236975, Machine Translation (Year: 2001).*

*Primary Examiner* — Ula C Ruddock
*Assistant Examiner* — Anna Korovina
(74) *Attorney, Agent, or Firm* — Oliff PLC

(57) ABSTRACT

A fuel cell includes power generation cells and an end cell. Each power generation cell has in it a gas passage, through which power generation gas passes. The fuel cell includes an introducing conduit, which distributes and introduces the power generation gas into the gas passages, and a discharging conduit, which merges flows of the power generation gas after passing through the gas passages and discharges the merged flow. The end cell has in it a bypass passage, which connects the introducing conduit and the discharging conduit to each other. The bypass passage is composed of parallel channels, each of which is independently connected to the introducing conduit. The parallel channels include lower parallel channels and upper parallel channels. The pressure loss in each of the lower parallel channels is smaller than the pressure loss in each of the upper parallel channels.

4 Claims, 9 Drawing Sheets

(51) Int. Cl.
*H01M 8/241* (2016.01)
*H01M 8/04291* (2016.01)

(56) References Cited

U.S. PATENT DOCUMENTS

| | | | | |
|---|---|---|---|---|
| 2004/0202911 A1* | 10/2004 | Komura | ............... | H01M 8/0247 |
| | | | | 429/454 |
| 2004/0229100 A1* | 11/2004 | Komura | ............... | H01M 8/0247 |
| | | | | 429/457 |
| 2005/0095492 A1* | 5/2005 | Frank | ................... | H01M 8/026 |
| | | | | 429/434 |
| 2007/0202383 A1* | 8/2007 | Goebel | ............... | H01M 4/8605 |
| | | | | 429/444 |
| 2010/0129694 A1* | 5/2010 | Sugiura | ................ | H01M 8/026 |
| | | | | 429/483 |

* cited by examiner

US 10,547,069 B2

FUEL CELL HAVING END CELL WITH BYPASS PASSAGE

BACKGROUND OF THE INVENTION

The present invention relates to a fuel cell that is composed of stacked cells.

Power generation cells of a polymer electrolyte fuel cell each include a membrane electrode assembly (so-called MEA) and a pair of separators sandwiching the membrane electrode assembly. The membrane electrode assembly has an electrolyte membrane made of an ion-exchange membrane and a pair of electrodes sandwiching the electrolyte membrane. Then, fuel gas (for example, hydrogen gas) is supplied to a gas passage formed between one of the pair of separators and the membrane electrode assembly, and oxidation gas (for example, air) is supplied to a gas passage formed between the other separator and the membrane electrode assembly.

Typically, a fuel cell is configured by stacking a plurality of power generation cells together. The fuel cell has in it an introducing conduit, which distributes and introduces a power generation gas to the gas passages of the power generation cells, and a discharging conduit, which merges flows of the power generation gas after passing through the gas passages and discharges the merged flow.

Japanese Laid-Open Patent Publication No. 2009-164051 discloses such a fuel cell that has end cells provided at the ends in the stacking direction of a plurality of power generation cells. The end cell is composed of, for example, a plate and a pair of separators sandwiching the plate. A bypass passage is formed between the plate and each separator. The bypass passage connects the introducing conduit and the discharging conduit to allow the power generation gas to flow therethrough.

The end cells are configured not to generate power and exert a heat insulating effect at the ends in the stacking direction of the power generation cells. Such end cells limit temperature drop of the power generation cells arranged at the ends in the stacking direction, thereby suppressing generation of water due to condensation or the like inside the power generation cells.

Generation of water due to condensation or the like can occur not only inside the power generation cells, but also in the gas supply passage, which supplies the power generation gas to the inside from the outside of the fuel cell. Such water in the gas supply passage can be carried away by gas flow in order to enter the power generation cells in order to stay. This reduces the amount of gas supplied to the membrane electrode assembly and thus may decrease the power generation efficiency.

SUMMARY OF THE INVENTION

Accordingly, it is an objective of the present invention to provide a fuel cell that is capable of limiting inflow of water into power generation cells.

To achieve the foregoing objective and in accordance with one aspect of the present invention, a fuel cell is provided that includes a plurality of stacked power generation cells, an end cell, which is provided at least at one of opposite ends in a stacking direction of the power generation cells, gas passages, which are respectively formed in the power generation cells and through which power generation gas passes, an introducing conduit, which distributes and introduces the power generation gas into the gas passages, a discharging conduit, which merges flows of the power generation gas after passing through the gas passages and discharges the merged flow, and a bypass passage, which is formed in the end cell to connect the introducing conduit and the discharging conduit to each other. Each power generation cell includes a membrane electrode assembly and a pair of separators, which sandwich the membrane electrode assembly. The end cell is configured not to generate power. The bypass passage is composed of a plurality of parallel channels, each of which is independently connected to the introducing conduit. The parallel channels include a plurality of lower parallel channels and a plurality of upper parallel channels. A pressure loss in each of the lower parallel channels is smaller than a pressure loss in each of the upper parallel channels.

DETAILED DESCRIPTION OF THE PREFERRED EMBODIMENTS

A fuel cell according to one embodiment will now be described with reference to the drawings.

First, the schematic configuration of the fuel cell will be described.

Figure 1:
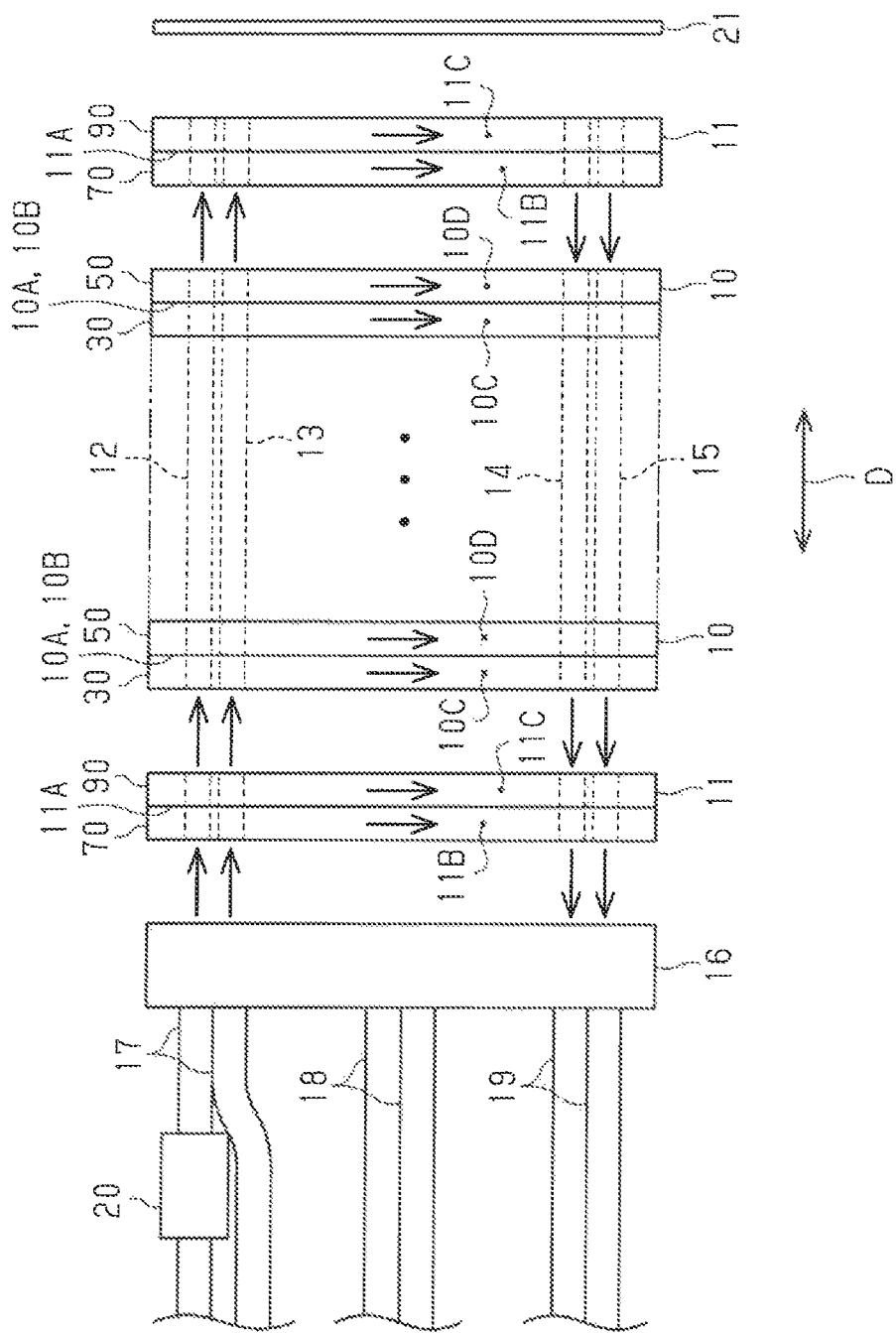
FIG. 1 is an exploded diagram schematically showing a fuel cell according to one embodiment.

As shown in FIG. 1, the fuel cell includes stacked power generation cells 10 and a pair of end cells 11 provided at positions sandwiching the power generation cells 10 in a stacking direction D (the lateral direction in FIG. 1). The fuel cell of the present embodiment has 330 power generation cells 10. The fuel cell of the present embodiment is installed as a power source in an electric vehicle.

The fuel cell has in it a hydrogen gas introducing conduit 12 and an air introducing conduit 13. The hydrogen gas introducing conduit 12 distributes and introduces hydrogen gas to each power generation cell 10 and each end cell 11. The air introducing conduit 13 distributes and introduces air to each power generation cell 10 and each end cell 11. The fuel cell also has in it a hydrogen gas discharging conduit 14 and an air discharging conduit 15. The hydrogen gas discharging conduit 14 merges flows of hydrogen gas after the gas has passed through the power generation cells 10 and the end cells 11 and discharges the merged flow of the hydrogen gas. The air discharging conduit 15 merges flows of air after the air has passed through the power generation cells 10 and the end cell 11 and discharges the merged flow of the air. Further, the fuel cell has in it a coolant introducing conduit (not shown) and a coolant discharging conduit (not shown). The coolant introducing conduit (not shown) introduces coolant into between adjacent power generation cells 10 and between each end cell 11 and the adjacent power generation cell 10. The coolant discharging conduit (not shown) merges flows of coolant and discharges the merged flow of the coolant.

A stack manifold 16 is attached to one (the left side as viewed in FIG. 1) of the pair of end cells 11 so as to cover the outer side end face in the stacking direction D. A hydrogen gas pipe 17 for supplying/discharging hydrogen gas, an air pipe 18 for supplying/discharging oxygen gas (specifically, air), and a coolant pipe 19 for supplying/discharging coolant are connected to the stack manifold 16. In the fuel cell, the stack manifold 16 allows, therethrough, hydrogen gas to be supplied to the hydrogen gas introducing conduit 12, air to be supplied to the air introducing conduit 13, hydrogen gas to be discharged from the hydrogen gas discharging conduit 14, air to be discharged from the air discharging conduit 15, coolant to be supplied to the coolant introducing conduit, and coolant to be discharged from the coolant discharging conduit. A humidifier 20 is provided on the hydrogen gas pipe 17. The humidifier 20 is located upstream of the stack manifold 16 to humidify hydrogen gas. In the present embodiment, the stack manifold 16 and hydrogen gas pipe 17 correspond to a gas supply passage that introduces hydrogen gas from the outside to the inside of the hydrogen gas introducing conduit 12.

An end plate 21 is attached to the other end cell 11 (the right side as viewed in FIG. 1) of the pair of end cells 11 so as to cover the outer side end face in the stacking direction D. The end plate 21 closes the openings of the fluid passages at the end face of the end cell 11 (the hydrogen gas introducing conduit 12, the air introducing conduit 13, the hydrogen gas discharging conduit 14, the air discharging conduit 15, the coolant introducing conduit, and the coolant discharging conduit).

The structure of the power generation cell 10 will now be described.

The power generation cell 10 has a membrane electrode assembly 10A. The membrane electrode assembly 10A has a five-layer structure including an electrolyte membrane that is a solid polymer membrane, a pair of electrodes sandwiching the electrolyte membrane, and a pair of gas diffusion layers sandwiching the electrolyte membrane and the electrodes. Each gas diffusion layer is formed by a carbon sheet. Each power generation cell 10 is composed of a first separator 30, a second separator 50, and a flat plate-shaped frame plate 10B sandwiched between the first and second separators 30, 50. The central portion of the frame plate 10B is constituted by the membrane electrode assembly 10A. The portion of the frame plate 10B other than the central portion is made of an insulating material. That is, the portion of the frame plate 10B other than the portion constituted by the membrane electrode assembly 10A is made of an insulating material.

Figure 2:
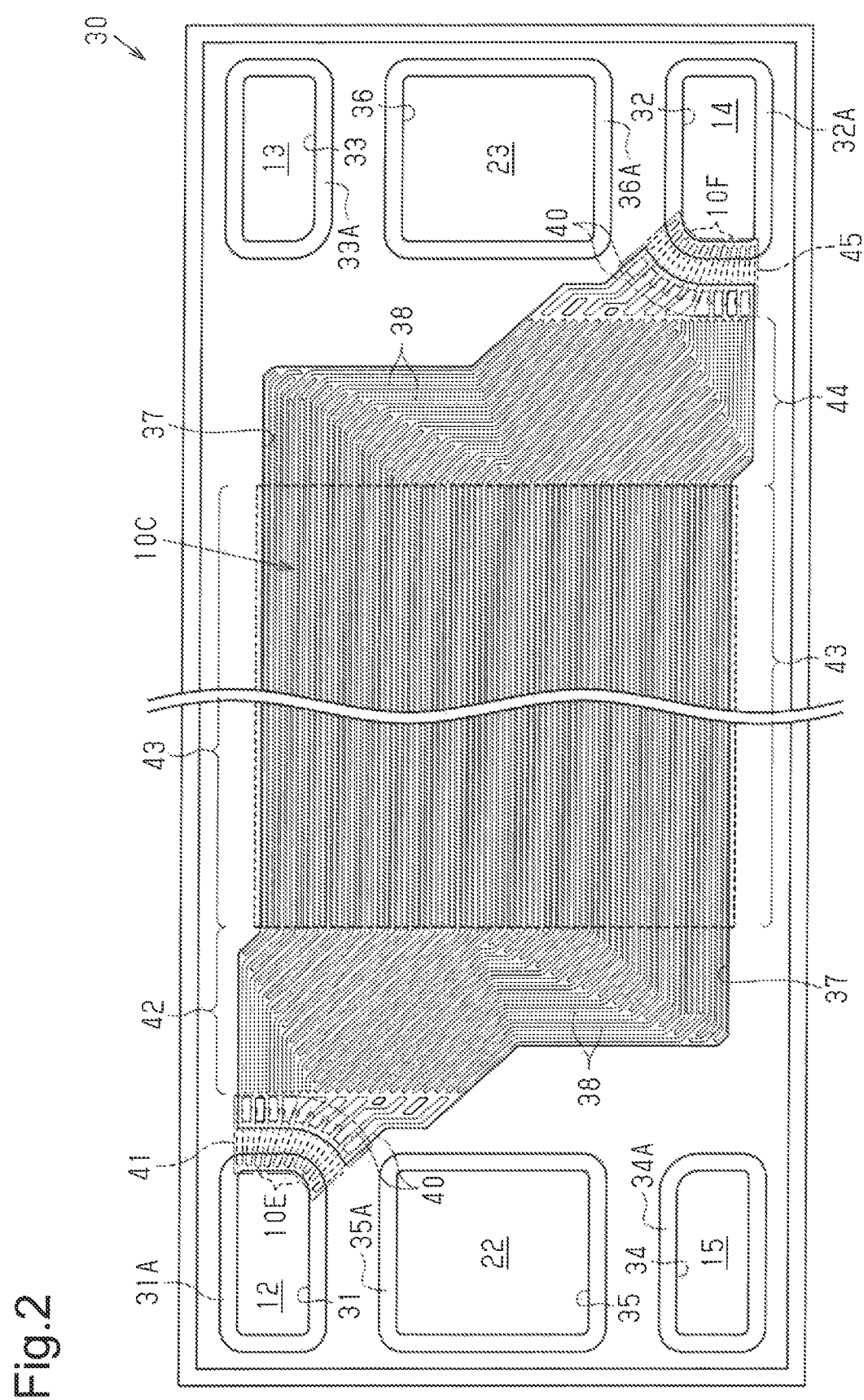
FIG. 2 is a plan view of a first separator of a power generation cell.

As shown in FIG. 2, the first separator 30 is made by pressing a metal thin plate to provide projections and depressions on it. The projections and depressions function to define a hydrogen gas passage 10C, which allows hydrogen gas to pass through the interior of the power generation cell 10, and a coolant passage, through which coolant flows between adjacent power generation cells 10. FIG. 2 shows the surface of the first separator 30 that faces the frame plate 10B (see FIG. 1).

The first separator 30 has through-holes 31 to 36. The through-hole 31 is provided at a first side in the longitudinal direction (the lateral direction in FIG. 2) of the first separator 30. Specifically, the through-hole 31 is located in an upper portion at the first side (the upper left portion in FIG. 2). The through-hole 31 forms part of the hydrogen gas introducing conduit 12. The through-hole 32 is provided in the lower portion at the second side in the longitudinal direction of the first separator 30 (the lower right portion in FIG. 2). The through-hole 32 forms part of the hydrogen gas discharging conduit 14. The through-hole 33 is provided in the upper portion at the second side in the longitudinal direction of the first separator 30 (the upper right portion in FIG. 2). The through-hole 33 forms part of the air introducing conduit 13. The through-hole 34 is provided in the lower portion at the first side in the longitudinal direction of the first separator 30 (the lower left portion in FIG. 2). The through-hole 34 forms part of the air discharging conduit 15. The through-hole 35 is provided at the first side in the longitudinal direction of the first separator 30. The through-hole 35 constitutes part of a coolant introducing conduit 22 that distributes and introduces coolant into the coolant passage. The through-hole 36 is provided at the second side in the longitudinal direction of the first separator 30. The through-hole 36 constitutes part of a coolant discharging conduit 23 that merges flows of coolant after passing through the coolant passages and discharges the merged flow of the coolant. The inner peripheral edges of the through-holes 31, 32, 33, 34, 35, 36 respectively constitute recesses 31A, 32A, 33A, 34A, 35A, 36A dented in a direction away from the frame plate 10B.

The first separator 30 has a recess 37 in the central portion in the longitudinal direction. The range in which the recess 37 is formed includes a portion adjacent to the membrane electrode assembly 10A (a portion indicated by the broken line in FIG. 2). Inside the power generation cell 10, the first separator 30 and the frame plate 10B (see FIG. 1) are in close contact with each other. Thus, between the first separator 30 and the frame plate 10B, the recess 37 defines a space constituting part of the hydrogen gas passage 10C, through which hydrogen gas passes.

A plurality of passage protrusions 38 is formed on the bottom of the recess 37. The passage protrusions 38 are formed in an elongated shape and extend in parallel. The passage protrusions 38 divide the hydrogen gas passage 10C into multiple parallel channels 40, each of which independently connects the hydrogen gas introducing conduit 12 (the through-hole 31) and the hydrogen gas discharging conduit 14 (the through-holes 32) with each other. In the present embodiment, the hydrogen gas passage 10C is divided into ten parallel channels 40 by the passage protrusions 38. Specifically, the ten parallel channels 40 include ten introducing paths 41 individually connected to the hydrogen gas introducing conduit 12, a plurality of distribution paths 42 branching each introducing path 41 into eight paths, and eighty main paths 43, which are individually connected to the distribution paths 42 and extend in parallel. Further, the parallel channels 40 include a plurality of convergence paths 44, which converges the main paths 43 into ten paths, and discharging paths 45, which individually connect the converged convergence paths 44 to the hydrogen gas discharging conduit 14. In the present embodiment, the shapes of the distribution paths 42 and convergence paths 44 are determined such that the hydrogen gas flowing into one of the parallel channels 40 is distributed to eight of the main paths 43. In the present embodiment, the distribution paths 42 and the main paths 43 correspond to branching path.

Figure 3:
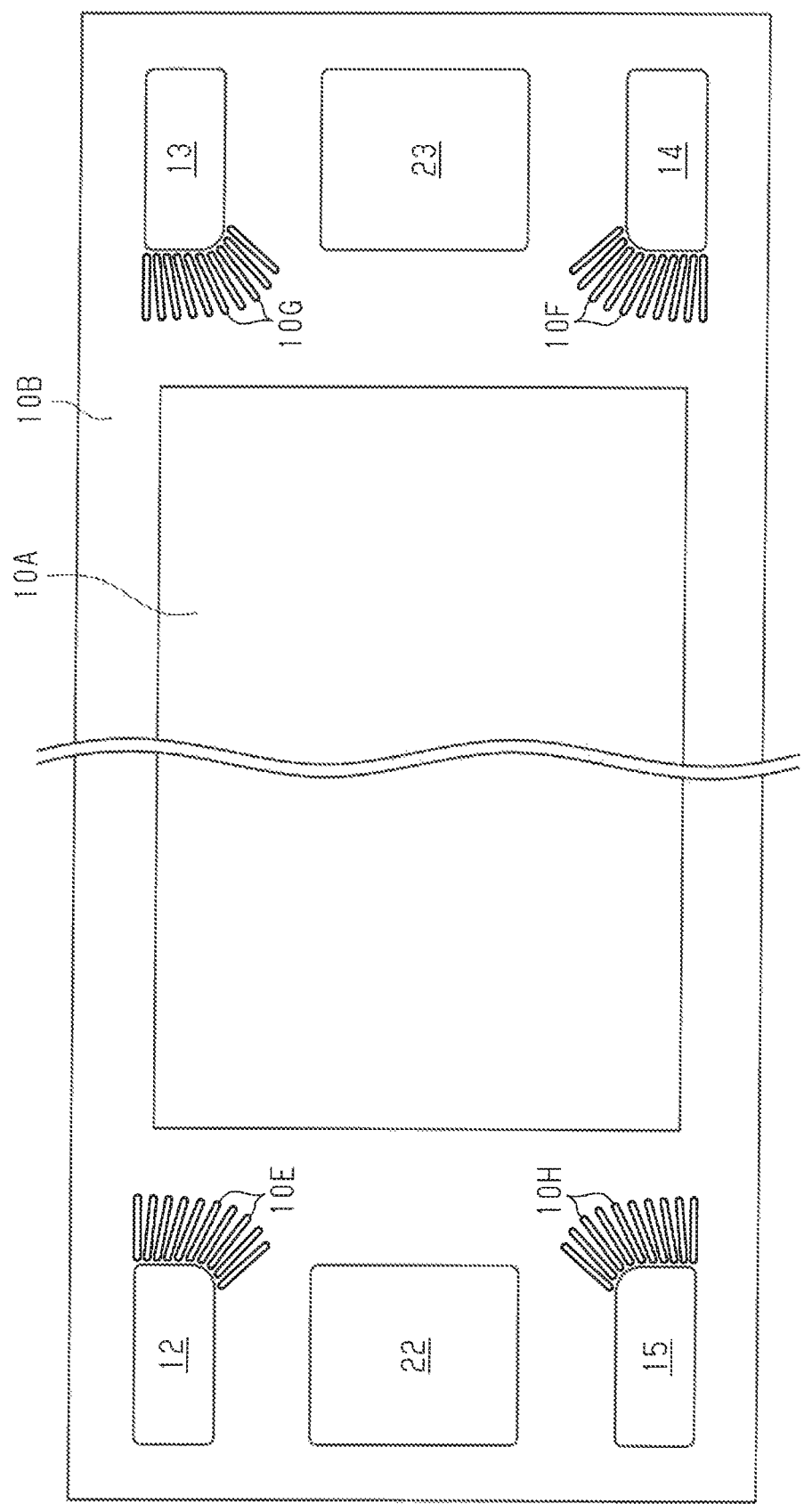
FIG. 3 is a plan view of a frame plate of the power generation cell.

As shown in FIG. 3, the frame plate 10B has multiple through-holes each constituting part of one of the fluid conduits (the hydrogen gas introducing conduit 12, the air introducing conduit 13, the hydrogen gas discharging conduit 14, the air discharging conduit 15, the coolant introducing conduit 22, and the coolant discharging conduit 23).

Inside the power generation cell 10, the frame plate 10B and the first separator 30 (see FIG. 2) are in close contact with each other at the periphery of each through-hole. Thereby, between the opposed faces of the frame plate 10B and the first separator 30, the hydrogen gas introducing conduit 12, the air introducing conduit 13, the hydrogen gas discharging conduit 14, the air discharging conduit 15, the coolant introducing conduit 22, and the coolant discharging conduit 23 are sealed from the exterior.

As shown in FIGS. 2 and 3, the frame plate 10B has a plurality of elongated holes 10E, which extend from positions adjacent to the through-hole 31 (specifically, the recess 31A) to positions adjacent to the recess 37. In the present embodiment, the frame plate 10B has ten elongated holes 10E. The elongated holes 10E are gaps that are located between the first separator 30 and the second separator 50 and connect the hydrogen gas introducing conduit 12 (more specifically, the through-hole 31) and the interior of the recess 37 to each other. In the present embodiment, each elongated hole 10E constitutes part of the hydrogen gas passage 10C. Specifically, each elongated hole 10E constitutes part of the corresponding introducing path 41 that is in the vicinity of the hydrogen gas introducing conduit 12.

Also, the frame plate 10B has a plurality of elongated holes 10F, which extend from positions adjacent to the through-hole 32 (specifically, the recess 32A) to positions adjacent to the recess 37. In the present embodiment, the frame plate 10B has ten elongated holes 10F. The elongated holes 10F are gaps that are located between the first separator 30 and the second separator 50 and connect the hydrogen gas discharging conduit 14 (more specifically, the through-hole 32) and the interior of the recess 37 to each other. In the present embodiment, each elongated hole 10F constitutes part of the hydrogen gas passage 10C. Specifically, each elongated hole 10F constitutes part of the corresponding discharging path 45 that is in the vicinity of the hydrogen gas discharging conduit 14.

Figure 4:
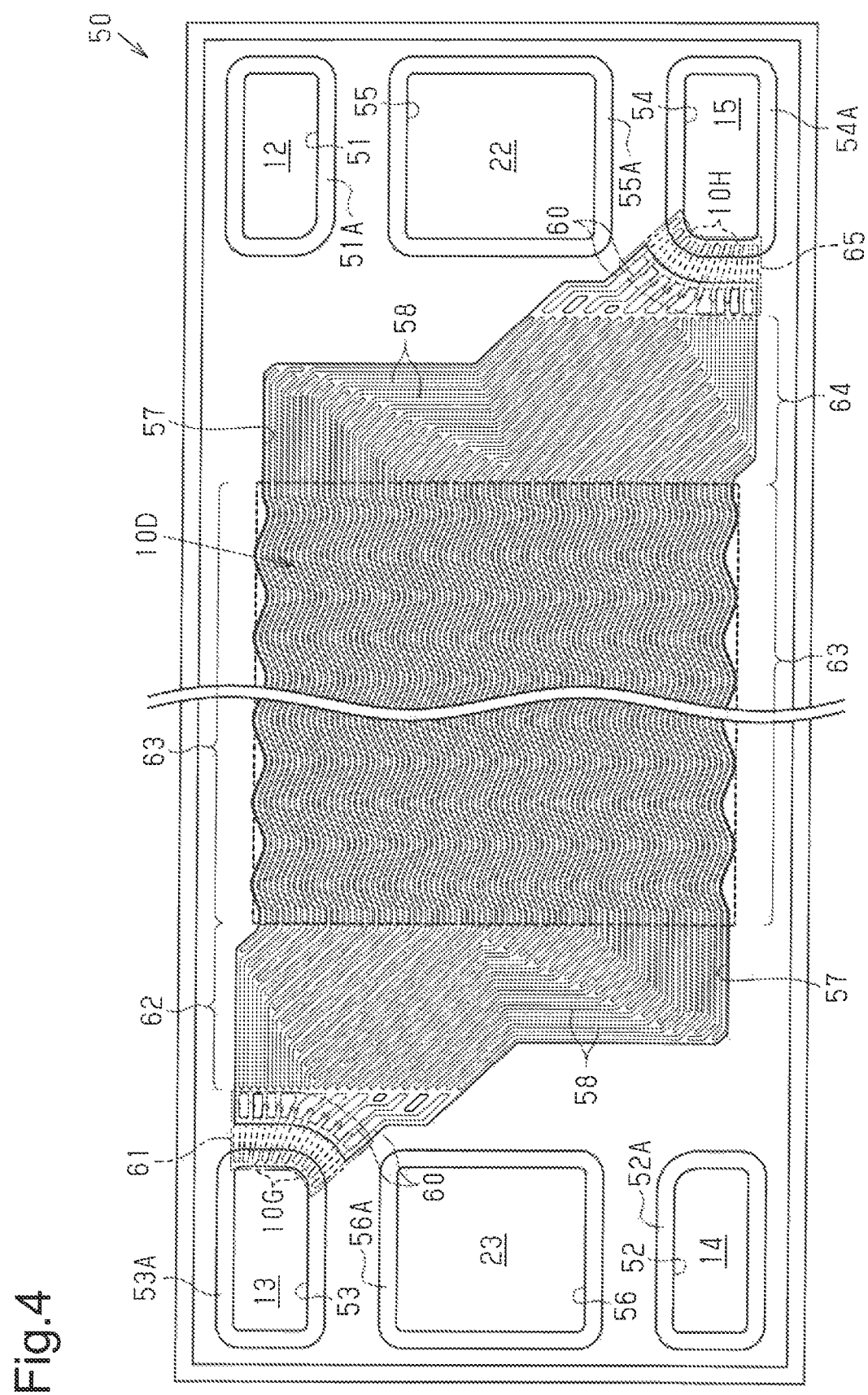
FIG. 4 is a plan view of a second separator of the power generation cell.

As shown in FIG. 4, the second separator 50 is made by pressing a metal thin plate to provide projections and depressions on it. The projections and depressions function to define a coolant passage and a gas passage (an air passage 10D), which allows air to pass through within the power generation cell 10. Basically, the shape of the second separator 50 is a mirror image of the shape of the first separator 30 (see FIG. 2). FIG. 4 shows the surface of the second separator 50 that faces the frame plate 10B (see FIG. 1).

The second separator 50 has through-holes 51 to 56. The through-hole 51 is provided in the upper portion at the first side in the longitudinal direction of the second separator 50 (the upper right portion in FIG. 4). The through-hole 51 forms part of the hydrogen gas introducing conduit 12. The through-hole 52 is provided in the lower portion at the second side in the longitudinal direction of the second separator 50 (the lower left portion in FIG. 4). The through-hole 52 forms part of the hydrogen gas discharging conduit 14. The through-hole 53 is provided in the upper portion at the second side in the longitudinal direction of the second separator 50 (the upper left portion in FIG. 2). The through-hole 53 forms part of the air introducing conduit 13. The through-hole 54 is provided in the lower portion at the first side in the longitudinal direction of the second separator 50 (the lower right portion in FIG. 4). The through-hole 54 forms part of the air discharging conduit 15. The through-hole 55 is provided at the first side in the longitudinal direction of the second separator 50. The through-hole 55 forms part of the coolant introducing conduit 22. The through-hole 56 is provided at the second side in the longitudinal direction of the second separator 50. The through-hole 56 forms part of the coolant discharging conduit 23. The inner peripheral edges of the through-holes 51, 52, 53, 54, 55, 56 respectively constitute recesses 51A, 52A, 53A, 54A, 55A, 56A dented in a direction away from the frame plate 10B.

The second separator 50 has a recess 57 in the central portion in the longitudinal direction. The range in which the recess 57 is formed includes a portion adjacent to the membrane electrode assembly 10A (a portion indicated by the broken line in FIG. 4). Inside the power generation cell 10, the second separator 50 and the frame plate 10B (see FIG. 1) are in close contact with each other. Thus, between the second separator 50 and the frame plate 10B, the recess 57 defines a space constituting part of the air passage 10D, through which air passes.

A plurality of passage protrusions 58 is formed on the bottom of the recess 57. The passage protrusions 58 are formed in an elongated shape and extend in parallel. The passage protrusions 58 divide the air passage 10D into multiple parallel channels 60, each of which independently connects the air introducing conduit 13 (the through-hole 53) and the air discharging conduit 15 (the through-holes 54) with each other. In the present embodiment, the air passage 10D is divided into ten parallel channels 60 by the passage protrusions 58. Specifically, the ten parallel channels 60 include ten introducing paths 61 individually connected to the air introducing conduit 13, a plurality of distribution paths 62 branching each introducing path 61 into eight paths, and eighty main paths 63, which are individually connected to the distribution paths 62 and extend in parallel. Further, the parallel channels 60 include a plurality of convergence paths 64, which converges the main paths 63 into ten paths, and discharging paths 65, which individually connect the converged convergence paths 64 to the air discharging conduit 15. In the present embodiment, the shapes of the distribution paths 62 and convergence paths 64 are determined such that the hydrogen gas flowing into one of the parallel channels 60 is distributed to eight of the main paths 63. As a result, the pressure loss in the parallel channels 60 is substantially equalized. The main paths 43 (see FIG. 2) of the first separator 30 are formed as straight paths. In the first separator 30, the straight main paths 43 extend in parallel at equal intervals. In contrast, the main paths 63 of the second separator 50 are constituted by wavy paths. In the second separator 50, the wavy main paths 63 extend in parallel at equal intervals.

Inside the power generation cell 10, the frame plate 10B and the second separator 50 (see FIG. 4) are in close contact with each other at the periphery of the through-holes of the frame plate 10B (FIG. 3). Thereby, between the opposed faces of the frame plate 10B and the second separator 50, the hydrogen gas introducing conduit 12, the air introducing conduit 13, the hydrogen gas discharging conduit 14, the air discharging conduit 15, the coolant introducing conduit 22, and the coolant discharging conduit 23 are sealed from the exterior.

As shown in FIGS. 3 and 4, the frame plate 10B has a plurality of elongated holes 10G, which extend from positions adjacent to the through-hole 53 (specifically, the recess 53A) to positions adjacent to the recess 57. In the present embodiment, the frame plate 10B has ten elongated holes 10G. The elongated holes 10G are gaps that are located between the first separator 30 and the second separator 50 and connect the air introducing conduit 13 (more specifically, the through-hole 53) and the interior of the recess 57 to each other. In the present embodiment, each elongated hole 10G constitutes part of the air passage 10D. Specifically, each elongated hole 10G constitutes part of the corresponding introducing path 61 that is in the vicinity of the air introducing conduit 13.

Also, the frame plate 10B has a plurality of elongated holes 10H, which extend from positions adjacent to the through-hole 54 (specifically, the recess 54A) to positions adjacent to the recess 57. In the present embodiment, the frame plate 10B has ten elongated holes 10H. The elongated holes 10H are gaps that are located between the first separator 30 and the second separator 50 and connect the air discharging conduit 15 (more specifically, the through-hole 54) and the interior of the recess 57 to each other. In the present embodiment, each elongated hole 10H constitutes part of the air passage 10D. Specifically, each elongated hole 10H constitutes part of the corresponding discharging path 65 that is in the vicinity of the air discharging conduit 15.

Inside the fuel cell, the coolant passage is defined between the outer surface of the first separator 30 of one of an adjacent pair of the power generation cells 10 and the outer surface of the second separator 50 of the other power generation cell 10. Also, between one of the pair of end cells 11 (the left side in FIG. 1) and the adjacent power generation cell 10, the outer surface of a fourth separator 90 of the end cell 11 and the outer surface of the first separator 30 of the power generation cell 10 define a coolant passage. Further, between the other one of the pair of end cells 11 (the right side in FIG. 1) and the adjacent power generation cell 10, the outer surface of a third separator 70 of the end cell 11 and the outer surface of the second separator 50 of the power generation cell 10 define a coolant passage. These coolant passages are connected to the coolant introducing conduit 22 and the coolant discharging conduit 23.

The structure of the end cell 11 will now be discussed.

As shown in FIG. 1, the end cell 11 is composed of a third separator 70, a fourth separator 90, and a frame plate 11A sandwiched between the third and fourth separators 70, 90. The fourth separator 90 has the same structure as the second separator 50 (see FIG. 4).

Figure 5:
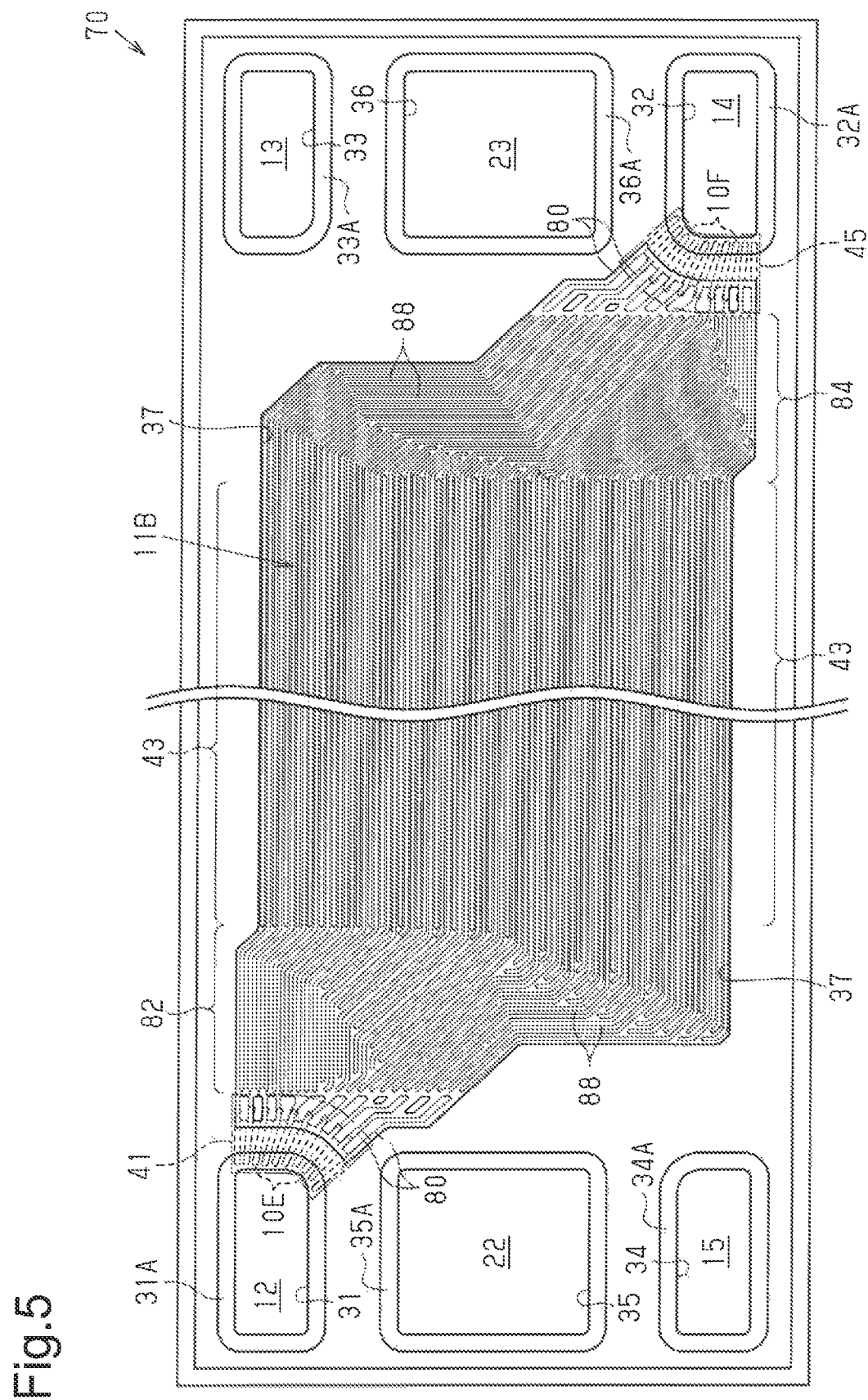
FIG. 5 is a plan view of a third separator of an end cell.

As shown in FIG. 5, the basic structure of the third separator 70 is the same as that of the first separator 30 (see FIG. 2). However, the first separator 30 and the third separator 70 are significantly different from each other in the shapes of the distribution paths and convergence paths constituting part of the hydrogen gas passages. The structure of the third separator 70 will now be described focusing on the difference. Since the components other than the distribution paths and the convergence paths are the same for the first separator 30 and the third separator 70, these components are denoted by the same reference numerals and the detailed description thereof will be omitted. FIG. 5 shows the surface of the third separator 70 that faces the frame plate 11A (see FIG. 1).

A plurality of passage protrusions 38 is formed on the bottom of the recess 37 of the third separator 70. The passage protrusions 38 divide, into multiple parallel channels 80, the hydrogen gas passage that connects the through-hole 31 (the hydrogen gas introducing conduit 12) and the through-hole 32 (the hydrogen gas discharging conduit 14) with each other. Hereinafter, the hydrogen gas passage, which connects the through-hole 31 (the hydrogen gas introducing conduit 12) and the through-hole 32 (the hydrogen gas discharging conduit 14) with each other, will be referred to as a bypass passage 11B. In the present embodiment, the bypass passage 11B is divided into ten parallel channels 80 by the passage protrusions 88. The shapes of distribution paths 82 and convergence paths 84 are determined such that the hydrogen gas flowing into each of the upper five of the parallel channels 80 is distributed to four of the main paths 43. On the other hand, the shapes of the distribution paths 82 and convergence paths 84 are determined such that the hydrogen gas flowing into each of the lower five of the parallel channels 80 is distributed to twelve of the main paths 43.

Figure 6:
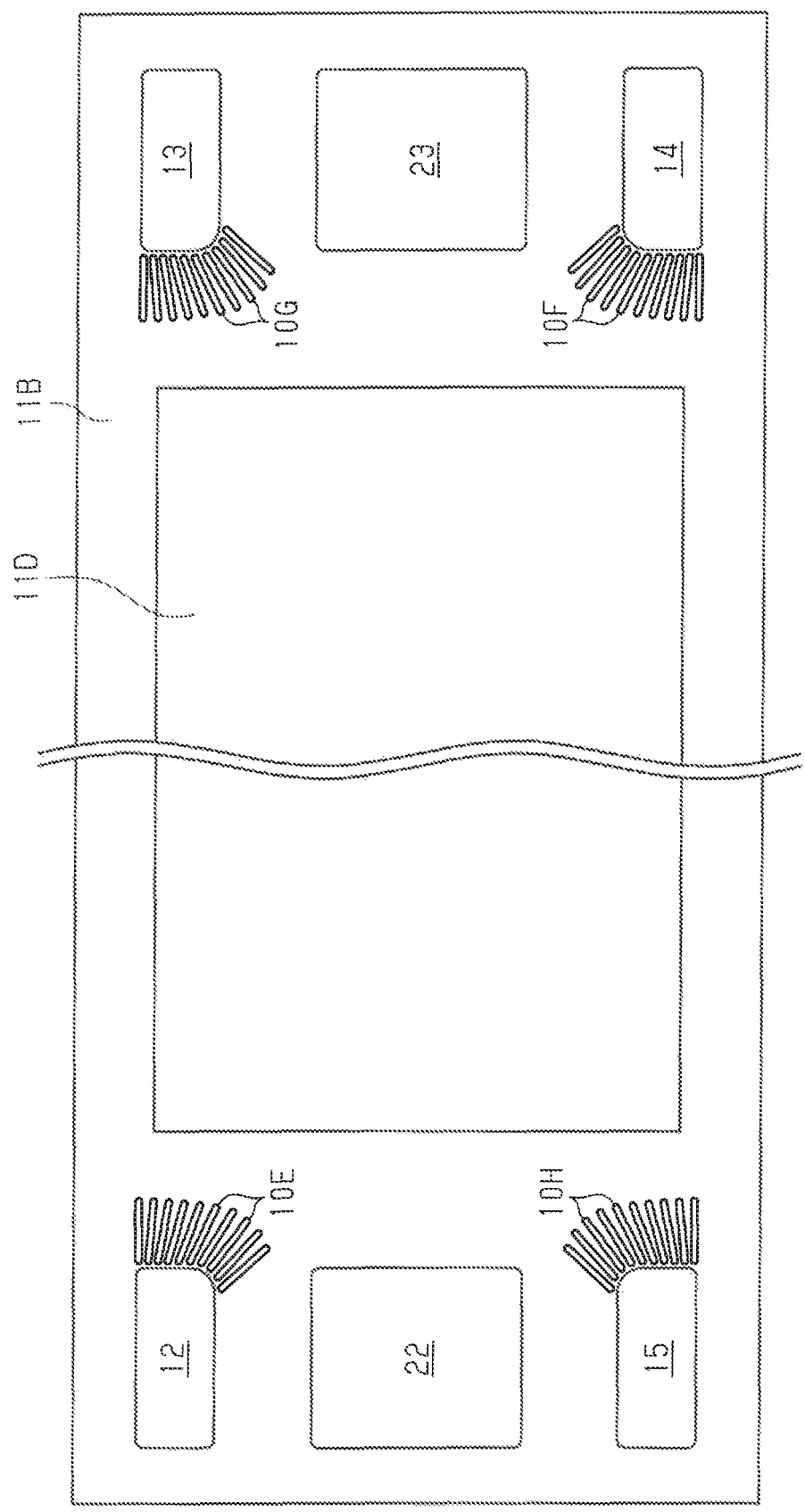
FIG. 6 is a plan view of a frame plate of the end cell.

As shown in FIG. 6, the basic structure of the frame plate 11A is the same as that of the frame plate 10B (see FIG. 3). The frame plate 11A is different from the frame plate 10B in that a plate 11D is provided in place of the membrane electrode assembly 10A. Specifically, the central portion of the frame plate 11A is constituted by the plate 11D. The portion of the frame plate 11A other than the central portion is made of an insulating material. The plate 11D has a three-layer structure including a plate main body made of a non-permeable electric conductor and a pair of carbon sheets sandwiching the plate main body. In the present embodiment, the plate body is made of a metal plate. The plate 11D is in contact with the third separator 70 and the fourth separator 90, and electrically connects the third separator 70 and the fourth separator 90 to each other. Since neither of the end cells 11 has a membrane electrode assembly 10A (see FIG. 1), the end cells 11 do not generate power although hydrogen gas and air pass therethrough. That is, the end cells 11 are configured not to generate power.

Hereinafter, the specific structure of the frame plate 11A will be described. In FIG. 6, the components having the same structure as the corresponding components in the frame plate 10B are denoted by the same reference numerals and the detailed description thereof will be omitted.

The frame plate 11A has multiple through-holes each constituting part of one of the fluid conduits (the hydrogen gas introducing conduit 12, the air introducing conduit 13, the hydrogen gas discharging conduit 14, the air discharging conduit 15, the coolant introducing conduit 22, and the coolant discharging conduit 23). Inside the end cell 11, the frame plate 11A and the third separator 70 (see FIG. 5) are in close contact with each other at the periphery of each through-hole. The frame plate 11A and the second separator 50 (see FIG. 4) are also in close contact with each other at the periphery of each through-hole. Thereby, the hydrogen gas introducing conduit 12, the air introducing conduit 13, the hydrogen gas discharging conduit 14, the air discharging conduit 15, the coolant introducing conduit 22, and the coolant discharging conduit 23 are sealed from the exterior.

As shown in FIGS. 5 and 6, the frame plate 11A has a plurality of elongated holes 10E, which extend from positions adjacent to the through-hole 31 (specifically, the recess 31A) to positions adjacent to the recess 37. The elongated holes 10E are gaps that are located between the third separator 70 and the fourth separator 90 and connect the hydrogen gas introducing conduit 12 (more specifically, the through-hole 31) and the interior of the recess 37 to each other. In the present embodiment, each elongated hole 10E constitutes part of the corresponding introducing path 41 of the bypass passage 11B that is in the vicinity of the hydrogen gas introducing conduit 12.

Also, the frame plate 11A has a plurality of elongated holes 10F, which extend from positions adjacent to the through-hole 32 (specifically, the recess 32A) to positions adjacent to the recess 37. The elongated holes 10F are gaps that are located between the third separator 70 and the fourth separator 90 and connect the hydrogen gas discharging conduit 14 (more specifically, the through-hole 32) and the interior of the recess 37 to each other. In the present embodiment, each elongated hole 10F constitutes part of the corresponding discharging path 45 of the bypass passage 11B that is in the vicinity of the hydrogen gas discharging conduit 14.

The frame plate 11A has a plurality of elongated holes 10G, which extend from positions adjacent to the through-hole 53 (specifically, the recess 53A) to positions adjacent to the recess 57. The elongated holes 10G are gaps that are located between the third separator 70 and the fourth separator 90 and connect the air introducing conduit 13 (more specifically, the through-hole 53) and the interior of the recess 57 to each other. In the present embodiment, each elongated hole 10G constitutes part of a bypass passage 11C (see FIG. 1), which connects the air introducing conduit 13 and the air discharging conduit 15 to each other. Specifically, each elongated hole 10G constitutes part of the corresponding introducing path 61 that is in the vicinity of the air introducing conduit 13.

Also, the frame plate 11A has a plurality of elongated holes 10H, which extend from positions adjacent to the through-hole 54 (specifically, the recess 54A) to positions adjacent to the recess 57. The elongated holes 10H are gaps that are located between the third separator 70 and the fourth separator 90 and connect the air discharging conduit 15 (more specifically, the through-hole 54) and the interior of the recess 57 to each other. In the present embodiment, each elongated hole 10H constitutes part of the corresponding discharging path 65 of the bypass passage 11C that is in the vicinity of the air discharging conduit 15.

Figure 7:
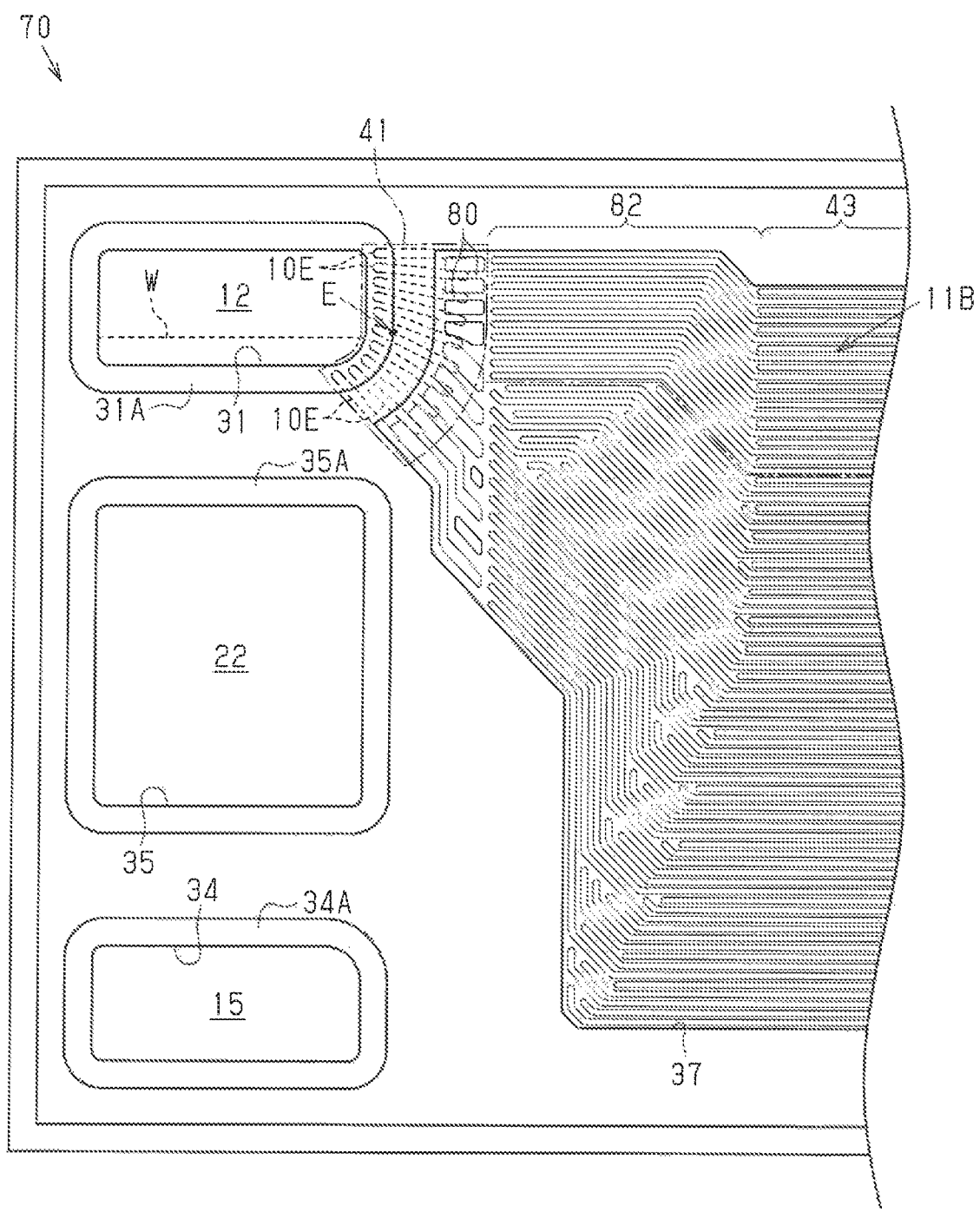
FIG. 7 is an enlarged plan view of part of the third separator.

The broken line W in FIG. 7 represents the water level (hereinafter referred to as the maximum water level) when water flows into the hydrogen gas introducing conduit 12 at the maximum flow rate in the assumed range in the fuel cell in a resting state. The maximum water level W indicates the water level obtained from the results of various experiments and simulations conducted by the inventors. As shown in FIG. 7, the shapes of parallel channels 80 of the third separator 70 are determined such that the upper edge of the end close to the hydrogen gas introducing conduit 12 of the highest one of the lower five parallel channels 80 is located above the maximum water level W. The upper edge of the end close to the hydrogen gas introducing conduit 12 of the upper most one of the lower five parallel channels 80 corresponds to the portion indicated by the arrow E in FIG. 7. The long dashed short dashed line in FIG. 7 represents the boundary between the lower parallel channels 80 and the upper parallel channels 80.

Hereinafter, the operational effects obtained by the use of the end cell 11 having the third separator 70 will be described.

The end cell 11 has in it the bypass passage 11B, which connects the hydrogen gas introducing conduit 12 and the hydrogen gas discharging conduit 14 to each other. Therefore, water that has been generated in the hydrogen gas pipe 17 or the humidifier 20 and entered the fuel cell (the hydrogen gas introducing conduit 12) can be drawn into the end cell 11 by the flow of hydrogen gas flowing into the end cell 11 (more specifically, the bypass passage 11B) from the hydrogen gas introducing conduit 12. This limits inflow of water into the power generation cell 10.

When water flows into and remains in the bypass passage 11B of the end cell 11, the flow-passage cross-sectional area of the bypass passage 11B (specifically, the parallel channels 80 into which the water has flowed) decreases, accordingly. This may stagnate the flow of hydrogen gas flowing into the bypass passage 11B. In this case, it is impossible to adequately draw water from the hydrogen gas introducing conduit 12 to the bypass passage 11B.

As shown in FIG. 5, in the bypass passage 11B of the end cell 11, the number of the main paths 43 to which one parallel channel 80 is to distribute hydrogen gas is greater in the lower parallel channels 80 than in the upper parallel channels 80. That is, the number of the main paths 43 of one parallel channel 40 is greater in the lower parallel channels 80 than in the upper parallel channels 80. Thus, the integrated value of the flow-passage cross-sectional area of the main paths 43 in each of the lower parallel channels 80 (the total value of the flow-passage cross-sectional area of the twelve main paths 43) is greater than the integrated value of the flow-passage cross-sectional area of the main paths 43 in each of the upper parallel channels 80 (the total value of the flow-passage cross-sectional area of the four main paths 43). Therefore, among the parallel channels 80, which constitute the bypass passage 11B, the pressure loss in the lower parallel channels 80, into which water easily flows, is made smaller than the pressure loss in the upper parallel channels 80, into which water cannot easily flow.

Figure 8:
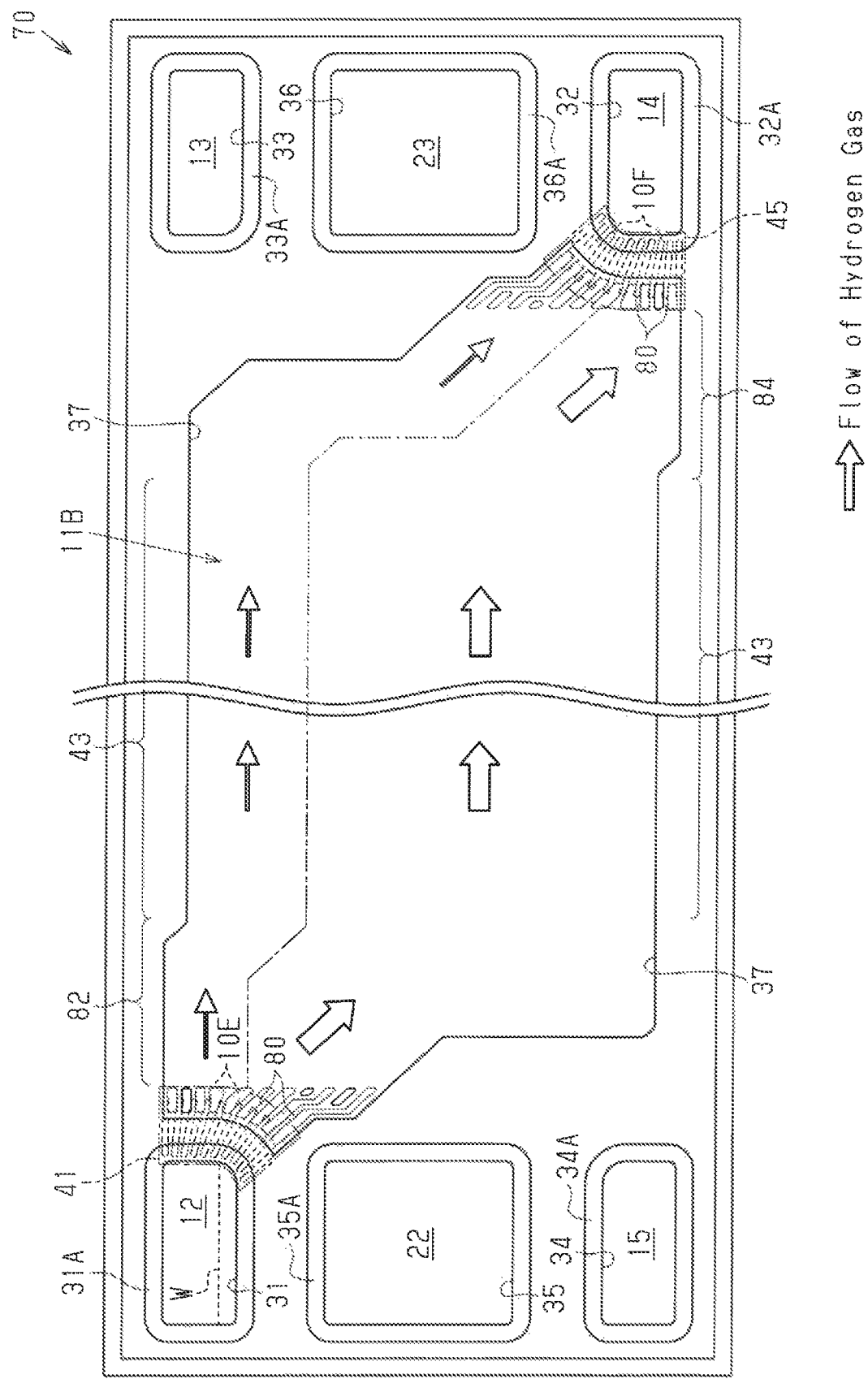
FIG. 8 is a plan view of the third separator, illustrating a manner in which hydrogen gas flows inside the end cell.

Hence, the amount of hydrogen gas flowing into the lower parallel channels 80 is increased as schematically shown in FIG. 8, while the amount of hydrogen gas flowing into the upper parallel channels 80 is limited to a small amount. As a result, when water is drawn and flows into the lower parallel channels 80, the drawn-in water is easily carried away by the relatively great amount of gas flowing into the parallel channels 80. Therefore, it is possible to suppress the stagnation of water in the parallel channels 80 and to maintain the function of drawing water into the bypass passage 11B. The long dashed short dashed line in FIG. 8 represents the boundary between the lower parallel channels 80 and the upper parallel channels 80.

As shown in FIG. 2, in the hydrogen gas passage 10C of the power generation cell 10, the number of main paths 43 to which one parallel channel 40 distributes hydrogen gas is eight, which is common to all the parallel channels 40. Accordingly, the integrated value of the flow-passage cross-sectional area of the main paths 43 in each parallel channel 40 (the total value of the flow-passage cross-sectional area of the eight main paths 43) is also common to all the parallel channels 40, and these parallel channels 40 have a substantially equal pressure loss.

Figure 9:
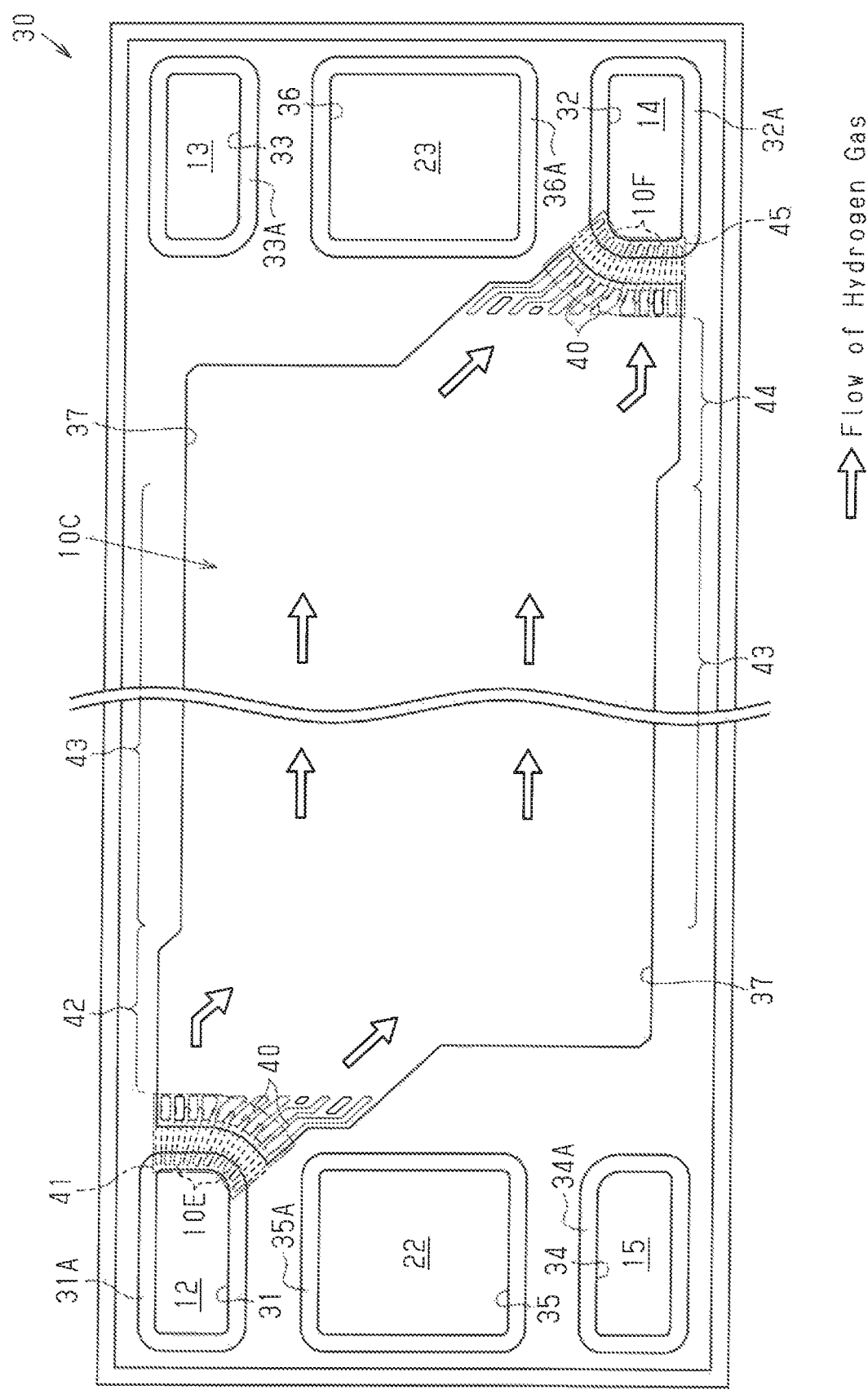
FIG. 9 is a plan view of the first separator, illustrating a manner in which hydrogen gas flows inside the power generation cell.

Therefore, as schematically shown in FIG. 9, hydrogen gas uniformly flows into the hydrogen gas passage 10C (the respective parallel channels 40) of the power generation cell 10 in a state with a limited unevenness of the inflow amount. In contrast, as described above, in the bypass passage 11B (FIG. 8) of the end cell 11, the inflow amount of hydrogen gas into the upper parallel channels 80 is limited to a small amount, so that the inflow amount of hydrogen gas into the lower parallel channels 80 is increased. Accordingly, it is possible to maximize the amount of hydrogen gas flowing into the parallel channels 80 on the lower side of the end cell 11 among the portions in the fuel cell into which hydrogen gas flows from the hydrogen gas introducing conduit 12. The portions in the fuel cell into which hydrogen gas flows from the hydrogen gas introducing conduit 12 specifically refer to the parallel channels 40 of the power generation cell 10, the parallel channels 80 on the lower side of the end cell 11, and the parallel channels 80 on the upper side of the end cell 11. This allows the water in the hydrogen gas introducing conduit 12 to be easily drawn into the end cell 11, so that the water is reliably restrained from flowing into the power generation cell 10.

As shown in FIG. 7, the uppermost one of the five parallel channels 80 on the lower side in the end cell 11 is arranged such that the upper edge E of the end close to the hydrogen gas introducing conduit 12 (the left side in FIG. 7) is located above the maximum water level W. More specifically, the upper edge of the communication portion between the through-hole 31 and the uppermost one of the lower five parallel channels 80 is above the maximum water level W. Thus, when the water that has flowed into the hydrogen gas introducing conduit 12 reaches the position of the end cell 11 (more specifically, the communication portion between the hydrogen gas introducing conduit 12 and the bypass passage 11B), the water will be located not at the ends of the upper parallel channels 80, but at the ends of the lower parallel channels 80, in which the velocity of inflow is high due to a great inflow amount of hydrogen gas. Therefore, by using the flow of hydrogen gas flowing into the lower parallel channels 80 from the hydrogen gas introducing conduit 12, the water in the hydrogen gas introducing conduit 12 is reliably drawn into the bypass passage 11B.

In the fuel cell of the present embodiment, the hydrogen gas pipe 17 is connected to the end cell 11 at one end (the left side in FIG. 1) in the stacking direction D via the stack manifold 16. Thus, when water flows into the hydrogen gas introducing conduit 12 from the hydrogen gas pipe 17 or the stack manifold 16, the water is drawn in by the end cell 11 before reaching the power generation cell 10. This reduces the amount of water reaching the power generation cell 10. Also, due to swaying or turning of the electric vehicle, the water that has flowed into the hydrogen gas introducing conduit 12 may pass through the portion where the power generation cells 10 are arranged and reach the end cell 11 farther from the stack manifold 16 (the end cell 11 on the right side as viewed in FIG. 1). In such a case, the water that has reached the position of the end cell 11 can be drawn into the bypass passage 11B of the end cell 11. In this manner, the fuel cell according to the present embodiment reliably limits the inflow of water into the power generation cell 10.

As described above, the present embodiment achieves the following advantages.

(1) Water that has been generated in the hydrogen gas pipe 17 or the humidifier 20 and entered the hydrogen gas introducing conduit 12 can be drawn into the bypass passage 11B of the end cell 11 by the flow of hydrogen gas flowing into the bypass passage 11B from the hydrogen gas introducing conduit 12. This limits inflow of water into the power generation cell 10. Also, among the parallel channels 80, which constitute the bypass passage 11B, the pressure loss in each of the lower parallel channels 80, into which water easily flows, is made smaller than the pressure loss in each of the upper parallel channels 80, into which water cannot easily flow. Thus, when water is drawn and flows into the lower parallel channels 80, the drawn-in water is easily carried away by the relatively great amount of gas flowing into the parallel channels 80. Therefore, it is possible to suppress the stagnation of water in the parallel channels 80 and to maintain the function of drawing water into the bypass passage 11B.

(2) The uppermost one of the lower parallel channels 80 is arranged such that the upper edge of the end close to the hydrogen gas introducing conduit 12 is located above the maximum water level W. Therefore, by using the flow of hydrogen gas flowing into the lower parallel channels 80 from the hydrogen gas introducing conduit 12, the water in the hydrogen gas introducing conduit 12 is reliably drawn into the bypass passage 11B.

(3) The hydrogen gas pipe 17 is connected to the end cell 11 arranged at one end in the stacking direction D. As a result, when water flows from the hydrogen gas pipe 17 to the hydrogen gas introducing conduit 12, the water is drawn into the bypass passage 11B of the end cell 11 before reaching the power generation cell 10. This reliably limits the inflow of water into the power generation cell 10.

(4) In the bypass passage 11B of the end cell 11, the number of the main paths 43 of each of the lower parallel channels 80 is set to be greater than the number of the main paths 43 of each of the upper parallel channels 80. Therefore, among the parallel channels 80, which constitute the bypass passage 11B, the pressure loss in each lower parallel channel 80, into which water easily flows, is made smaller than the pressure loss in each upper parallel channel 80, into which water cannot easily flow.

(5) In the hydrogen gas passage 10C of the power generation cell 10, the number of the main paths 43 of one parallel channel 40 is set to be common to all the parallel channels 40. Accordingly, it is possible to maximize the amount of hydrogen gas flowing into the parallel channels 80 on the lower side of the end cell 11 among the portions in the fuel cell into which hydrogen gas flows from the hydrogen gas introducing conduit 12. This allows the water in the hydrogen gas introducing conduit 12 to be easily drawn into the end cell 11, so that the water is reliably restrained from flowing into the power generation cell 10.

<Modifications>

The above-described embodiment may be modified as follows.

The main paths 43 of the first separator 30 and the third separator 70 may be constituted by wavy paths. That is, the first separator 30 and the third separator 70 may be formed such that multiple wavy main paths 43 extend in parallel. The main paths 63 of the second separator 50 and the fourth separator 90 may be constituted by straight paths. That is, the second separator 50 and the fourth separator 90 may be formed such that multiple straight main paths 63 extend in parallel.

The pressure loss of the parallel channels 80 may be made different from each other by differentiating the passage widths and passage heights of a plurality of main paths 43 constituting part of the bypass passage 11B to differentiate the flow-passage cross sectional area of the main paths 43.

The end cell is not limited to the one constituted by the third separator 70, the fourth separator 90, and the plate 11D sandwiched between the third separator 70 and the fourth separator 90. An end cell may be employed that is composed of two separators and a plate or sheet made of porous material (a carbon sheet having the same structure, for example, as the gas diffusion layer) sandwiched between the two separators. In this case, if hydrogen gas and air are allowed to pass through one end cell, the flow of the hydrogen gas and the flow of the air may interfere with each other inside the end cell, which may hinder smooth suction of water into the end cell and smooth discharge of water to the outside. Thus, a pair of end cells, consisting of an end cell configured to allow only hydrogen gas to pass through and an end cell configured to allow only air to pass through, are preferably installed at the opposite ends of the power generation cells 10 in the lamination direction D, respectively.

The uppermost one of the lower parallel channels 80 may be arranged such that the upper edge of the end close to the hydrogen gas introducing conduit 12 is located below the maximum water level W.

The end cell may have a fourth separator having a basic structure that is a mirror image of the shape of the third separator 70. For example, the pressure loss of each of the lower parallel channels of the fourth separator of the end cell may be smaller than the pressure loss of each of the upper parallel channels. With this configuration, in a fuel cell in which water can enter the air introducing conduit from the air pipe, the entered water is drawn into the bypass passage by the flow of air flowing from the air introducing conduit into the bypass passage. This limits the inflow of water into the power generation cells. Further, when water is drawn into the lower parallel channels of the end cell, the drawn in water is easily carried away by a relatively great amount of gas flowing into the parallel channels. Therefore, it is possible to suppress the stagnation of water in the parallel channels and to maintain the function of drawing water into the bypass passage.

The fuel cell of the above-illustrated embodiment can also be applied to a fuel cell in which the humidifier 20 is not provided in the hydrogen gas pipe 17.

The present invention is not limited to the configuration in which one end cell 11 is provided at each end in the stacking direction D of the power generation cells 10. Instead, two or more end cells may be provided at each end.

The fuel cell of the above-illustrated embodiment can also be applied to a fuel cell in which an end cell is provided at only one of the opposite ends in the stacking direction D of the power generation cells 10.

The fuel cell of the above-illustrated embodiment is applicable not only to a fuel cell mounted on an electric vehicle, but also to a fuel cell immovably fixed to the ground such as a residential fuel cell.

The invention claimed is:

1. A fuel cell comprising:
   a plurality of stacked power generation cells;
   an end cell, which is provided at least at one of opposite ends in a stacking direction of the power generation cells;
   gas passages, which are respectively formed in the power generation cells and through which power generation gas passes;
   an introducing conduit, which distributes and introduces the power generation gas into the gas passages;
   a discharging conduit, which merges flows of the power generation gas after passing through the gas passages and discharges the merged flow; and
   a bypass passage, which is formed in the end cell to connect the introducing conduit and the discharging conduit to each other, wherein
   each power generation cell includes
      a membrane electrode assembly, and
      a pair of separators, which sandwich the membrane electrode assembly,
   the end cell is configured not to generate power,
   the bypass passage is composed of a plurality of parallel channels, each of which is independently connected to the introducing conduit, the plurality of parallel channels include
   a plurality of lower parallel channels and a plurality of upper parallel channels,
   a pressure loss in the plurality of lower parallel channels is smaller than a pressure loss in the plurality of upper parallel channels,
   each of the plurality of parallel channels include an introducing path, which is connected to the introducing conduit, and a plurality of branching paths, which branch and extend from the introducing path, and a number of the plurality of branching paths in the plurality of lower parallel channels is greater than a number of the plurality of branching paths in the plurality of upper parallel channels.

2. The fuel cell according to claim 1, wherein an upper edge of an end close to the introducing conduit of a highest one of the lower parallel channels is located above a maximum water level of water flowing into the introducing conduit.

3. The fuel cell according to claim 1, wherein the end cell is connected to a gas supply passage that introduces the power generation gas from outside to inside of the introducing conduit.

4. The fuel cell according to claim 1, wherein
   each of the gas passages is composed of a plurality of parallel channels, each of which is independently connected to the introducing conduit, and
   the parallel channels in each gas passage have an equal pressure loss.

* * * * *